SEQUENTIALLY GATED PLURAL CHANNEL INPUT TO SINGLE CHANNEL OUTPUT SYSTEM HAVING FEEDBACK MEANS FOR ELIMINATING PEDESTAL

Filed Oct. 26, 1960 2 Sheets-Sheet 1

INVENTORS
ROBERT J. McCURDY
LAWRENCE A. MATONAK
BY
ATTORNEYS

Sept. 4, 1962 R. J. McCURDY ET AL 3,052,849

SEQUENTIALLY GATED PLURAL CHANNEL INPUT TO SINGLE CHANNEL OUTPUT SYSTEM HAVING FEEDBACK MEANS FOR ELIMINATING PEDESTAL

Filed Oct. 26, 1960 2 Sheets-Sheet 2

INVENTORS
ROBERT J. McCURDY
LAWRENCE A. MATONAK
BY
ATTORNEYS

United States Patent Office 3,052,849 Patented Sept. 4, 1962

3,052,849

SEQUENTIALLY GATED PLURAL CHANNEL INPUT TO SINGLE CHANNEL OUTPUT SYSTEM HAVING FEEDBACK MEANS FOR ELIMINATING PEDESTAL

Robert J. McCurdy, Riverton, N.J., and Lawrence A. Matonak, Canoga Park, Calif., assignors, by mesne assignments, to the United States of America as represented by the Secretary of the Navy Filed Oct. 26, 1960, Ser. No. 65,243
6 Claims. (Cl. 328—97)

Figure 1:
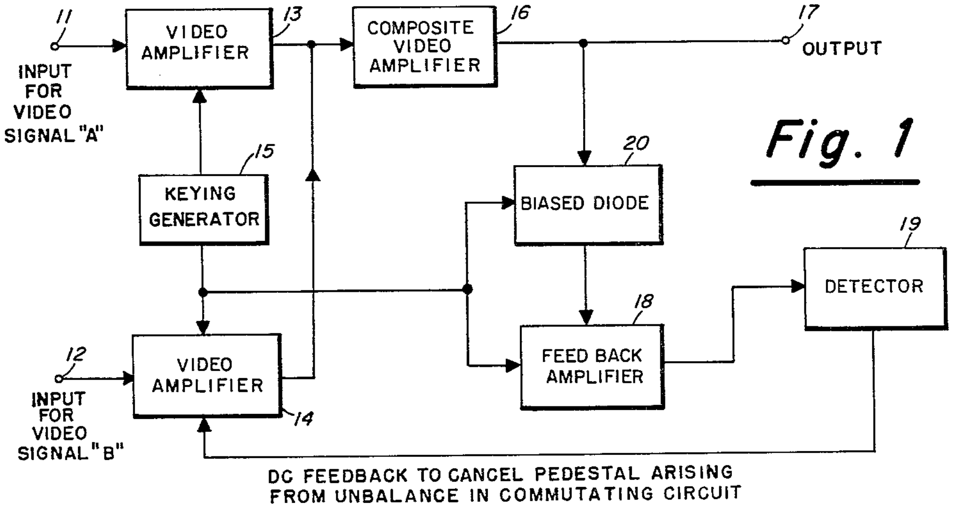

This invention relates to a gated amplifier and more particularly to a gated amplifier having an automatic D.C. level balance control.

In the prior art, when high speed electronic switching of video signals is employed, as when displaying moving target indicator video and normal video on a radar display or when using the split image technique for special effects on television, a major problem is encountered in the matching and holding of the D.C. levels of the mixed signals. The prior art methods utilized are: (1) manually adjusting the bias of one of the gated video amplifiers so that the two amplifiers have the same quiescent current, (2) clamping the D.C. level at the grids of both amplifiers so that changes in the video content of either of the video inputs will not cause an apparent shift in bias and cause a pedestal to appear or, (3) adjusting the bias of a later amplifier so that a considerable portion is clipped out of the composite signal thus removing any residual pedestal that may be present.

The first two of these attempts are not very effective because the signal level at this point is usually very low making the bias adjustment extremely critical and the clamping ineffective. The objection to the third method is obvious in that the video intelligence will be affected and a reduction of fidelity will result.

According to the invention, the outputs of the gated amplifiers are combined and passed into the input of a feedback amplifier. The feedback amplifier is gated on simultaneously with one of the signal amplifiers so that only one channel will be affected. The output of the feedback amplifier is then detected and fed back to the signal amplifier, which is simultaneously on, as a bias voltage. Thus, as the D.C. output level from this particular amplifier changes in one direction which would effect a pedestal on the mixed video, this average change in D.C. level is fed back as a bias which brings the D.C. level back to normal during the on time of this amplifier. A simple level adjustment in the feedback network is all that is required to match the D.C. levels of the two gated amplifiers. Hence, the disadvantages of the prior art are obviated in that balancing is accomplished with a simple non-critical adjustment after which the balancing is completely automatic. Since sharp cutoff amplifying elements are utilized in the gated amplifiers, the feedback will not affect the gain, but only the D.C. level, and consequently, there is no signal distortion present.

It is thus an object of the present invention to provide gated and switched amplification with a non-critical adjustment.

Another object of the present invention is to provide a gated amplifier in which the D.C. level when once adjusted will automatically remain in balance.

A further object of the invention is to provide a gated amplifier in which D.C. balancing is effected with no signal distortion.

Figure 3:
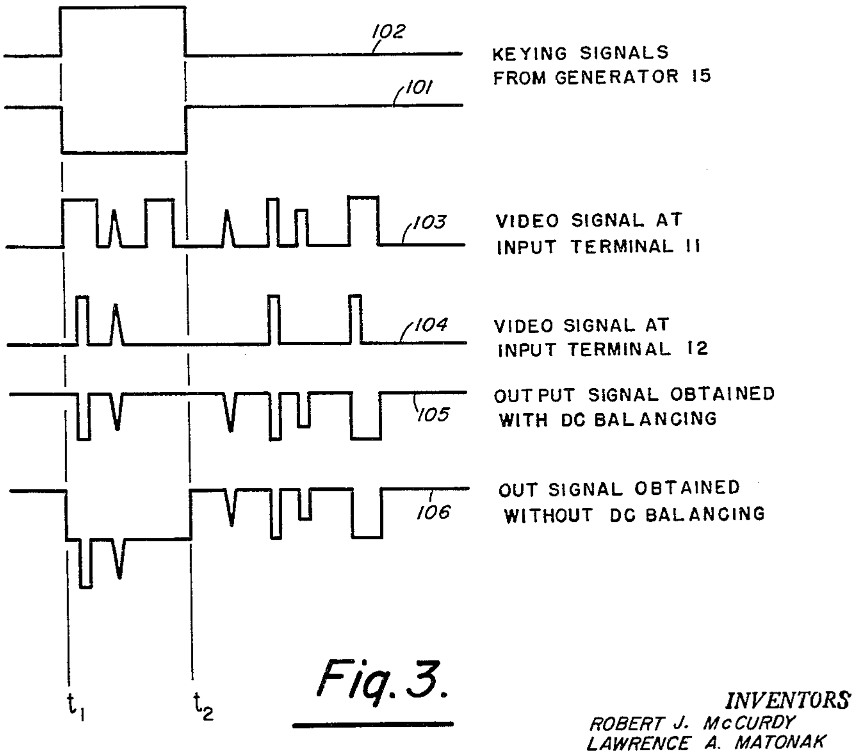
Figure 2:
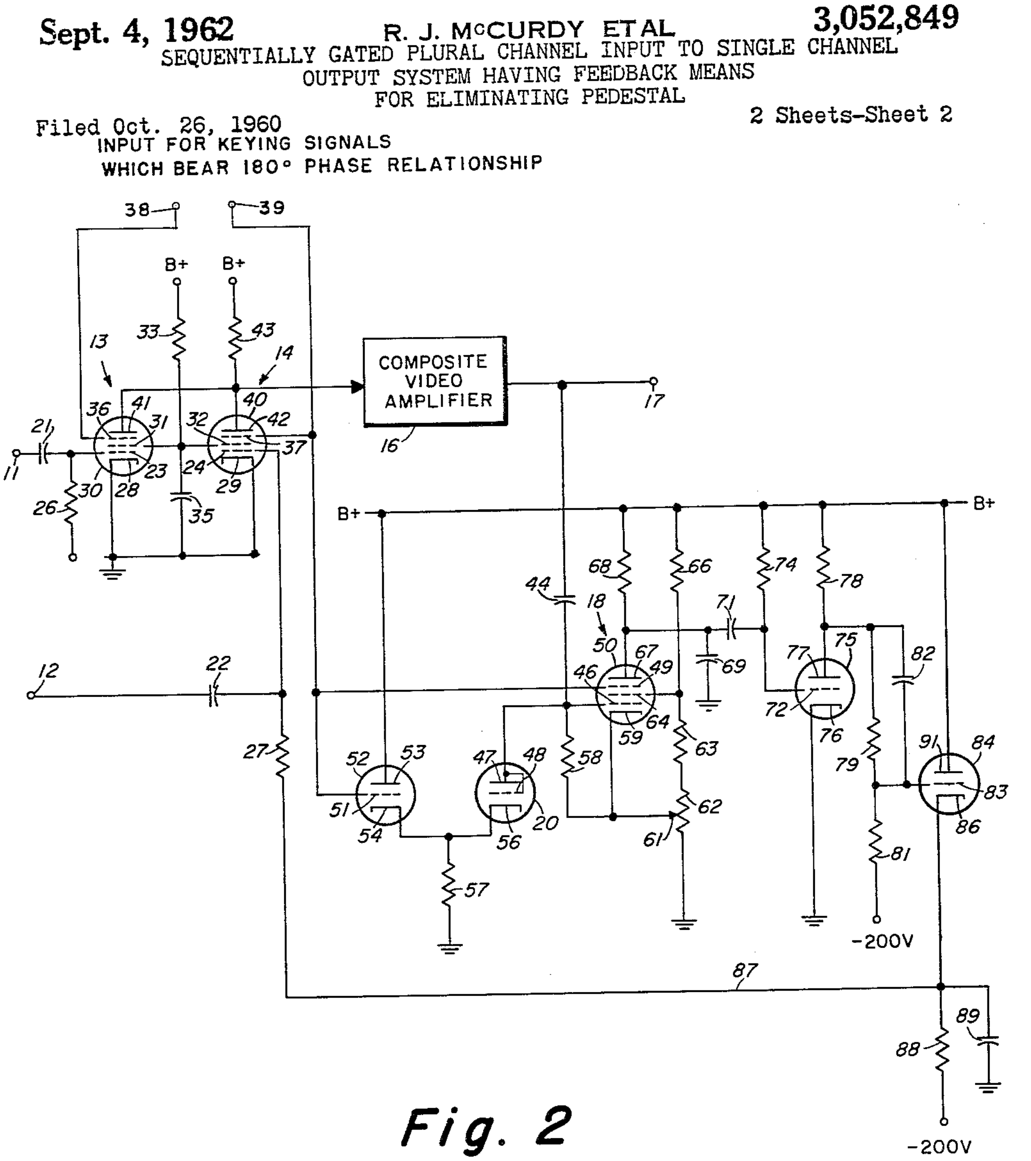

Further objects and many of the attendant advantages will be readily apparent with reference to the following detailed description taken in conjunction with the drawings in which:

FIG. 1 is a block diagram of a preferred embodiment of the present invention; and FIG. 2 is a schematic diagram of the block diagram of FIG. 1; and FIG. 3 is a graphic representation of voltage waveforms seen throughout the system of FIG. 1 and FIG. 2.

Referring now to FIG. 1, there is shown input terminals 11 and 12 for accepting video signals "A" and "B," respectively. The input terminals are connected to video amplifiers 13 and 14, respectively. The outputs of video amplifiers 13 and 14 are connected together and to the input of composite video amplifier 16 the output of which is connected to output terminal 17 and feedback amplifier 18. The output of feedback amplifier 18 is connected to detector 19, the output of which is connected to video amplifier 14. Keying generator 15 is connected to video amplifiers 13 and 14 and biased diode 20, the output of which is connected to feedback amplifier 18.

Referring to FIG. 2, input terminals 11 and 12 are connected through capacitors 21 and 22 respectively to control grids 23 and 24 of amplifiers 13 and 14 and through resistors 26 and 27 respectively. Cathodes 28 and 29 of amplifiers 13 and 14 are grounded. Screen grids 31 and 32 are connected together and through resistor 33 to B plus. Suppressor grids 36 and 37 are connected to keying signal input terminals 38 and 39, respectively. Plates 41 and 42 are connected together and through resistance 43 to B plus. Plates 41 and 42 are also connected to the input of composite video amplifier 16, the output of which is connected to output terminal 17 and through capacitor 44 to control grid 46 of feedback amplifier 18 and plate 47 of bias diode 20. Control grid 48 is also connected to plate 47. Suppressor grid 37 of video amplifier 14 is also connected to suppressor grid 49 of feedback amplifier 18 and control grid 51 of triode 52. Plate 53 of triode 52 is connected directly to B plus. Cathodes 54 and 56 are connected together and through resistance 57 to ground. Plate 47 and control grid 46 are also connected through resistor 58 to cathode 59 and sliding contact 61 of resistance 62. Resistance 62 is connected to ground and through resistance 63 to screen grid 64 of feedback amplifier 18. Screen grid 64 of feedback amplifier 18 is connected through resistance 66 to B plus. Plate 67 is connected through resistor 68 to B plus, through capacitor 69 to ground, and through capacitor 71 to control grid 72 of triode 73. Control grid 72 is also connected through resistance 74 to B plus. Cathode 76 is connected to ground and plate 77 is connected through resistance 78 to B plus and through resistances 79 and 81 to a negative reference potential. Capacitor 82 is connected across resistance 79 and the junction of resistances 79 and 81 is connected to control grid 83 of triode 84. Cathode 86 is connected to feedback bus 87, through resistance 88 to a negative reference potential and through capacitance 89 to ground. Plate 91 is connected to B plus. Bus 87 is connected through resistance 27 to control grid 24.

Referring now to FIG. 3, there are shown waveforms 101, 102, 103, 104, 105 and 106. Time lines $t_1$ and $t_2$ are indicated to show the relation of the waveforms to each other at these particular times.

*Operation*

Referring back to FIG. 1 there are shown two signal input terminals 11 and 12. These signal inputs can be video inputs, for example, from a normal and moving-target-indicator video to be utilized on a radar display. Taking, for example, the video applied to terminal 11 as the normal video and the video applied to terminal 12 as the moving-target-indicator video, it is necessary that keying generator 15 turn on video amplifier 14 for the moving-target-indicator portion of the return and turn off video amplifier 13 for that period. At the end of the MTI portion of the radar sweep video amplifier 14 is then turned off and video amplifier 13 turned on. The two outputs are combined in composite video amplifier 16 which amplifies them further and presents an output to output terminal 17 of the video signal at input terminal 12, followed by the video signal present at input terminal 11. At this point the system is recognized as a conventional gated and switched video amplifier. As previously pointed out however, without some form of D.C. level adjustment, the D.C. levels from video amplifiers 13 and 14 will not be equal and will present a pedestal effect on the output.

Referring to the waveforms of FIG. 3, waveform 101 is the output of keying generator 15 which is applied to video amplifier 13 and waveform 102 is the output of keying generator 15 simultaneously applied to video amplifier 14. It is obvious from the waveforms that they are 180° out of phase i.e. one amplifier is turned on while the other is turned off. This can be accomplished through the use of any conventional square-wave generator such as a multivibrator. Waveforms 103 and 104 are the videos applied to terminals 11 and 12, respectively. Thus, if video amplifier 14 is gated on between times $t_1$ and $t_2$, and video amplifier 13 gated off, there will appear at the output, waveform 106, for example, which shows the video input 104 inverted, followed by the video input 103 inverted, as amplifiers 13 and 14 are turned on and off, respectively. It is pointed out here that the pedestal between times $t_1$ and $t_2$ on waveform 106 is due to the imbalance of quiescent D.C. current flowing through video amplifiers 13 and 14. In this case the current flowing through amplifier 14 would be larger than that flowing through 13, increasing the voltage drop across the common load and lowering the D.C. level applied to amplifier 16.

An output, however, is coupled back from terminal 17 through feedback amplifier 18 and detected in detector 19, which controls the D.C. quiescent current flowing through video amplifier 14. Feedback amplifier 18 is gated at the same time video amplifier 14 is gated through biased diode 20. Thus, in the case of video amplifier 14 conducting more heavily than video amplifier 13 causing the pedestal observed in waveform 106, the feedback will be negative which will cut down the quiescent current in video amplifier 14 and restore the next video to a D.C. balanced condition shown in waveform 105. It is pointed out now that video amplifiers 13 and 14 utilize sharp cut-off active elements, i.e. the feedback voltage does not have an effect on the gain of the amplifiers but merely on the D.C. quiescent current level.

Referring to FIG. 2, a schematic breakdown is shown. Amplifiers 13 and 14 are shown as pentodes 30 and 40, with signal input terminals at 11 and 12 driving control grids 23 and 24 respectively.

The suppressor grids 36 and 37 are utilized as the input elements for input terminals 38 and 39 at which are applied switching gate waveforms 101 and 102 (FIG. 3), respectively. Thus, at time $t_1$ a negative square wave appears at input terminal 38, cutting off video amplifier 13 and a positive waveform 102 appears at input terminal 39 turning on video amplifier 14. Both cathodes are grounded, in this embodiment, with fixed bias applied to control grid 23 through resistor 26, and with the screen return to B plus through resistor 33 and bypassed by capacitor 35. Since both amplifiers use common plate load resistance 43, the output will be first the video applied to terminal 12 as amplifier 14 is turned on and then at time $t_2$ the video applied at terminal 11 as amplifier 13 is turned on. These outputs are further amplified in composite video amplifier 43 and taken at output terminal 17 to the remaining video circuitry.

Assuming typical input waveforms 103 and 104 applied to input terminals 11 and 12, the initial outputs would be the composite video shown at waveform 106 assuming a slight imbalance in D.C. quiescent plate current of amplifiers 13 and 14. This waveform is coupled through capacitor 44 to the input of feedback amplifier 18 shown as pentode 50.

Pentode 50 is held near cut off by the current flowing through diode 20 dropped across resistance 58. Capacitance 44 and resistance 58 provide the coupling circuit from output terminal 17 to the input of tube 50. Since resistance 57 is very small compared to resistance 58, the black level of the video 106 will be effectively clamped to ground by diode 20, and the video 106 signal will go negatively from ground, further cutting off pentode 50.

At the time amplifier 14 receives positive switching gate 102, triode 52 also receives this signal on control grid 51 which increases the current through resistance 57 cutting of D.-C. restorer diode 20. When current through diode 20 ceases, the bias on pentode 50 will not change because of the charge which has been stored on capacitor 44 by the previous restoring action of diode 20. However, since diode 20 is now deactivated by keying generator 15, the black level of the waveform 106 will be free to shift above or below the ground-referenced base line, in accordance with the direction of imbalance of amplifiers 13 and 14. The positive (black) part of the video 106 will cause pentode 50 to conduct, with the degree of conduction depending on the shift introduced by the pedestal in waveform 106. For the assumed case, the black level peaks at grid 46 will be less positive than they were prior to the appearance of switching gate 102. This will create small negative-going black level pulses on plate 67, which are stretched in capacitor 69 and coupled to control grid 72 through capacitor 71. The signal is then amplified in triode 75 and appears at plate 77 as a positive-going signal having been stretched in capacitor 69. This signal is then direct coupled to control grid 83 of triode 84, which is a cathode follower, and appears at cathode 86. Resistor 88 and capacitor 89 filter the signal to a D.C. level which is applied as bias through feedback bus 87 and resistor 27 back to control grid 24 of pentode 40. Since the black level pulses are smaller than they would be for a balanced condition, the D.C. voltage on the feedback bus 87 is more negative than normal. As was previously pointed out, the pedestal effect on waveform 106 was caused by a heavier current flowing through amplifier 14 than amplifier 13, and this is cut down by the negative bias feedback on bus 87.

The switching gate 102 is applied to grid 49 of pentode 50 to activate pentode 50 only during the time that amplifier 14 is active. If this were not done, the black peaks from amplifier 13 would also be detected, and the resultant D.C. on the feedback bus to amplifier 14 would be ambiguous.

If the reverse were true i.e. amplifier 13 were conducting more heavily than amplifier 14, the pedestal would appear at waveform 106 above the base line causing a more positive voltage to be fed back which would decrease the bias on amplifier 14 and increase the current through amplifier 14, bringing the system back into balance. Sliding contact 61 adjusts the operating voltages of tube 50 which has the effect of adjusting the overall feedback loop gain for optimum balance.

Obviously many modifications and variations of the present invention are possible in the light of the above teachings, for example, transistors could be utilized as the active elements. It is therefore to be understood that within the scope of the appended claims the invention may be practiced otherwise than as specifically described.

What is claimed is:

1. Apparatus for combining two video signals and balancing the black levels of same comprising first and second amplifiers each having an input and an output, said inputs being adapted to accept said video signals, respectively, means coupled to said amplifiers for alternately switching said amplifiers on and off, said first amplifier being on when said second amplifier is off and conversely, said second amplifier being on when said first amplifier is off, a third amplifier having an input and an output, means for coupling the outputs of said first and second amplifiers to said input of said third amplifier, means for detecting the black level of said video signal in said second amplifier, said detecting means having first and second inputs and an output, said first input coupled to said switching means, said detecting means being operable to detect when said second amplifier is on, said second input coupled to said output of said third amplifier output, a fourth amplifier having an input and an output, said input of said fourth amplifier being coupled to said output of said detecting means, and said output of said fourth amplifier being coupled to said input of said second amplifier.

2. Apparatus for combining first and second video signals and balancing the D.C. levels of same comprising means for amplifying said first video signal, means for amplifying said second video signal, each of said means having an input for accepting said first and second video signals, respectively, each of said means having an output, switching means coupled to each of said amplifying means for alternately switching said means on and off, one of said amplifying means being on when the other said amplifying means is off, an amplifier having an input and an output, said outputs of said amplifying means being coupled together and to said input of said amplifier, means for detecting variations in the D.C. level of said second video signal, said detecting means being coupled to said output of said amplifier, said input of said means for amplifying said second video signal and to said switching means, said detecting means being operable to detect during the periods when said means for amplifying said second video signal is on.

3. Apparatus according to claim 2 wherein said detecting means clamps to ground the D.C. level of the output of said amplifier when said means for amplifying said first video signal is on and said means for amplifying said second video signal is off.

4. Apparatus according to claim 2 wherein said means for amplifying said second video signal has a D.C. quiescent current and said detecting means when operable controls said quiescent current.

5. Apparatus for mixing two video signals and automatically balancing the D.C. levels of same comprising, a first amplifier having an input for accepting said first video signal, a second amplifier having an input for accepting said second video signal, said amplifiers each having an output, a third amplifier having an input and an output, said outputs of said first and second amplifiers being coupled together and to the input of said third amplifier, means coupled to said first and second amplifiers for alternately switching said first and second amplifiers on and off, said first amplifier being on when said second amplifier is off and conversely said second amplifier being on when said first amplifier is off, feedback means coupled to said output of said third amplifier, to said switching means and to said input of said second amplifier for controlling the D.C. level of said second video signal, said feedback means being operable to control said D.C. level of said second video signal when said second amplifier is on.

6. Apparatus according to claim 5 wherein said feedback means comprises a D.C. restorer and a multi-stage amplifier, said D.C. restorer is coupled to said switching means, said output of said third amplifier and said multistage amplifier, and said multi-stage amplifier is coupled to the input of said first amplifier.

References Cited in the file of this patent

UNITED STATES PATENTS

| | | |
|---|---|---|
| 2,825,757 | Dennison | Mar. 4, 1958 |
| 2,836,720 | Sternberg et al. | May 27, 1958 |
| 2,974,285 | Schenck | Mar. 7, 1961 |